United States Patent
Helmuth

[11] 3,770,338
[45] Nov. 6, 1973

[54] FIBER OPTICS LIGHT SOURCE
[75] Inventor: James G. Helmuth, Monrovia, Calif.
[73] Assignee: Chadwick-Helmuth Electronics, Inc., Monrovia, Calif.
[22] Filed: Aug. 19, 1971
[21] Appl. No.: 172,976

[52] U.S. Cl............. 350/96 R, 240/1 EL, 313/111, 350/96 B,
[51] Int. Cl. ............................................. G02b 5/16
[58] Field of Search ................. 350/96 R, 96 B; 313/110, 111; 240/ EI

[56] References Cited
UNITED STATES PATENTS
3,581,140   5/1971   Paquette ..................... 350/96 R X
3,327,712   6/1967   Kaufman et al. .............. 350/96 B X
3,597,647   8/1971   Rishton ..................... 350/96 B UX
3,463,595   8/1969   Blanc et al. ................. 350/96 B X Primary Examiner—John K. Corbin
Attorney—White, Haefliger & Bachand

[57] ABSTRACT

A light source comprises an envelope; means including electrode structure to produce light at a zone within the envelope, electrode metal becoming vaporized in that zone; and light conducting rod means terminally facing within the envelope toward that zone and with sufficient closeness thereto to prevent vaporized metal deposition thereon.

11 Claims, 9 Drawing Figures

PATENTED NOV 6 1973

3,770,338

INVENTOR.
JAMES G. HELMUTH
BY
White, Haefliger & Bachand
ATTORNEYS.

FIBER OPTICS LIGHT SOURCE

BACKGROUND OF THE INVENTION

This invention relates generally to light sources, and more particularly concerns a light source of very high light collecting and transmitting efficiency.

It is often desired to transmit light from a source to a remote illuminated object via so-called light pipes, as for example glass fibers which are flexible and serve to "bend" light as it is transmitted. It is found that undesirably large losses of light are encountered in coupling from the source (such as an arc) to the light pipe bundle. Prior efforts made to overcome this coupling loss problem have not been entirely satisfactory due to several factors. For example, optical imperfection of the source envelope and the required large aperture, short focal length lens prevent optimum light collection by the reimaging system; also, darkening of the envelope due to electrode erosion and redeposition on the envelope interior wall shorten the useful life of the source, especially at the high intensity levels required for the application.

SUMMARY OF THE INVENTION

It is a major object of the invention to provide a solution to the above described problems, the solution taking unusual advantage of the fact that light intensity varies in inverse square relation to the distance from a small source.

Basically, the invention is embodied in a source that comprises an envelope; means to produce light at a zone within the envelope; and, light conducting rod means terminally facing within the envelope toward that zone. As will be seen, the means to produce light may comprise spaced metallic electrodes between which an arc is produced in the zone; and, the rod means and envelope may be integral and consist of glass, the rod means projecting interiorly of the envelope and sufficiently close to the arc zone as to remain substantially free of vaporized electrode metal deposition. In this regard, it has been discovered that if the glass rod terminal lies too far from the arc zone, arc vaporized metal deposition thereon defeats the objective of enhancing light conduction from the arc to the source exterior, and to light pipes for example. It is further found that the glass rod end portion tends to fuse or melt if placed too close to the arc; and, this effect increases the distance from the arc to the terminal until no more melting occurs. Equilibrium at optimum distance is achieved with no deposition upon the rod end.

Another object of the invention includes the provision of a light pipe structure, as for example a bundle of light pipes, operatively connected with the rod means to receive light therefrom, such coupling for example being located exteriorly of the envelope.

A further object is to provide utilization means coupled with the remote end of the light pipe structure, one such device for example comprising an endoscope as will be described.

Additional objects include the provision of multiple rod means projecting within the source envelope; the provision of reflector structure to enhance intensity in the arc zone to which the rod terminal is directly exposed; and the provision of an unusually advantageous method of transmitting light from a source, as by operation of the rod means referred to herein.

These and other objects and advantages of the invention, as well as the details of illustrative embodiments, will be more fully understood from the following description and drawings, in which:

DRAWING DESCRIPTION

DETAILED DESCRIPTION

Figure 1:
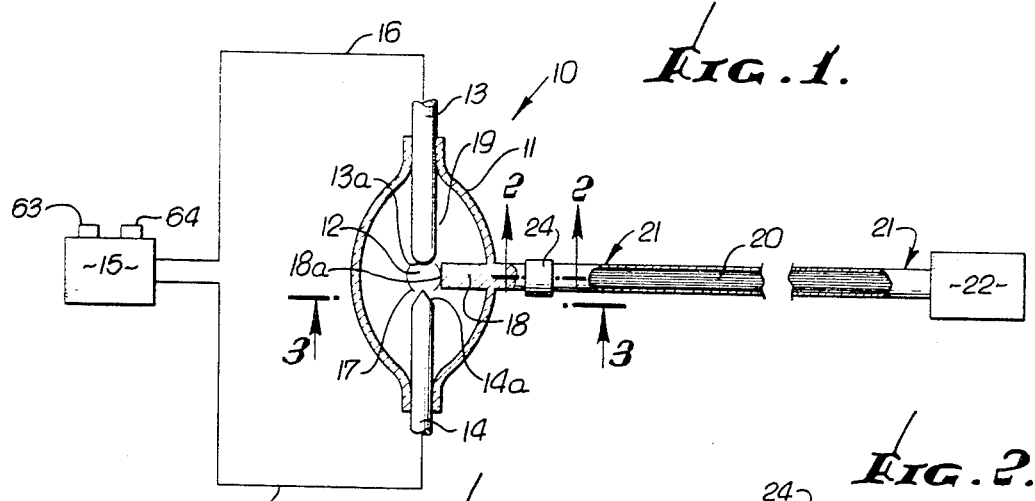
FIG. 1 is a vertical section taken through a light source embodying the invention.
Figures 2, 2A:
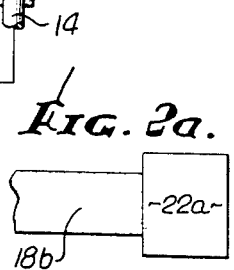
FIG. 2 is a section taken on line 2—2 of FIG. 1.
FIG. 2a is a fragmentary view of a modification.
Figure 3:
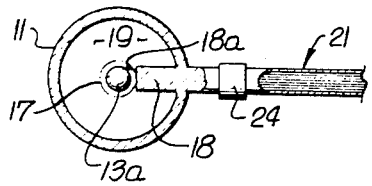
FIG. 3 is a section taken on line 3—3 of FIG. 1.

In FIGS. 1–3, the light source 10 is shown to include an envelope 11, means to produce light at a zone 12 within the envelope, and light conducting rod means terminally facing within the envelope toward that zone. The light producing means may for example comprise spaced metallic electrodes 13 and 14 to which electrical current may be supplied from a source 15 as via leads 16 and 17. Merely as illustrative, the electrodes may consist of tungsten; electrode 13 may have a rounded terminal 13a; and electrode 14 a tapered terminal 14a. The light produced in zone 12 may typically comprise a steady arc 17 the brightest portion of which is closer to terminal 14a than to terminal 13a, and/or a brief high energy flash arc which will tend to be uniformly bright through zone 12.

The referred to light conducting rod means may take the form illustrated at 18, actually projecting within the envelope interior 19 to terminally face at 18a the brightest portion of the arc 17, all for the purpose of collecting or receiving a maximum amount of light entering the rod end for conduction to the exterior of the envelope with minimum loss of intensity.

An important aspect of the invention concerns the maintenance of the rod end 18a relatively free of vaporized electrode metal deposition thereon. For this purpose, the rod 18 may consist of glass (as may envelope 11), as for example so-called quartz glass, and may project sufficiently close to the arc as to assure this condition. The degree of such closeness depends upon the light source design, arc maximum intensity, temperature and duration, it also being found that if the terminal 18a is too far from the arc, it will not remain free of such deposition, whereas if it is too close to the arc, it will suffer ablation due to arc temperature induced fusion. In this regard, it is further found that the latter condition will be alleviated (so that terminal 18a may extend closely adjacent the arc) by operating source 15 to pulse the arc. Merely as illustrative, in one example the voltage applied to the electrodes was varied between 300 and 500 volts; and, the arc duty cycle embraced an ON time of from 1 microsecond to 10 milliseconds and an OFF time as short as 1 millsecond.

For many purposes, it is desirable to transmit the collected light in a multiplicity of light pipes, as for example are indicated at 20 in a cable 21, leading to a utilization device 22. For this purpose, the end of the cable and pipes may be retained against the outer end 23 of the rod means 18 outside the envelope, as appears in FIGS. 1 and 2, a suitable coupling sleeve 24 surrounding the joint. In this regard, rod 18 may be formed integrally with the envelope, as shown, no extra seal being required between the two. Also, the interior 19 of the envelope may be suitably pressurized with a selected gas, for desired arc production. Merely as illustrative, the interior 19 may contain Xenon at about 10 atmospheres pressure.

Figure 4:
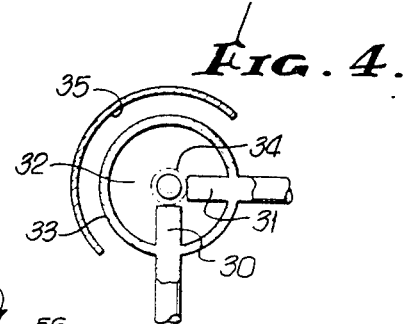
FIG. 4 is a section similar to FIG. 3, but showing a modified device.

Referring to FIG. 4, two light conducting rods 30 and 31 project into the interior 32 of the envelope 33, the rods each corresponding to rod 18 in FIG. 1. The rods are angularly spaced apart about the axis of the envelope or tube, for enhanced collection of light, an arc zone 34 being indicated closely adjacent the inner ends of the rods. A spherical reflector may be employed, as for example is indicated at 35, for reflecting escaping light back toward the inner ends of the rods 30 and 31, for maximum transmission to a utilization device or devices not shown.

Figure 5:
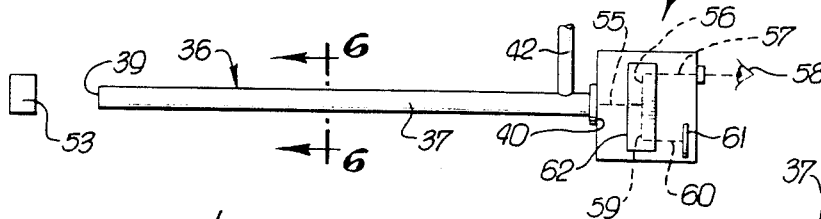
FIG. 5 is an elevation illustrating one application of the light source.
Figure 6:
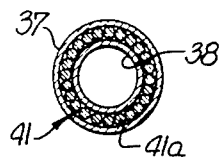
FIG. 6 is an enlarged section taken on line 6—6 of FIG. 5.

One example of a utilization device is indicated in FIGS. 5 and 6 in the form of an endoscope 36 useful in surgical or medical techniques for inspecting body cavities. The endoscope includes an elongated probe body 37 comprising an inner tube 38 containing imaging optics through which the user may view or photograph an illuminated object at the end 39 of the probe, and from the external end 40, the tube 38 extending the length of the unit. Illumination may be effected as via a bundle 41 of light pipes 41a clustered about tube 38 and extending lengthwise of same. The pipes may extend in a cable at 42 to a light source as described in FIG. 1, the cable 42 corresponding to cable 21 in that view.

Figure 7:
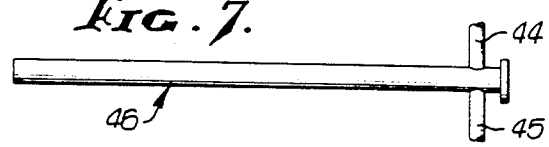
FIG. 7 is an elevation showing another application of the light source.

Two light pipe cables, or more, may be employed as at 44 and 45 in FIG. 7 to conduct light from dual light transmitting rods (as at 30 and 31 in FIG. 4) to an endoscope 46 as indicated in FIG. 7, whereby even greater illumination of the object being examined may be achieved. Light pipes in each cable may extend along the probe 37 in the manner indicated in FIG. 6.

While use of the light source in endoscope application has been described, it will be understood the other medical and non-medical applications of the source are contemplated, as is clear from FIG. 1.

Referring back to FIG. 1, power source 15 may be operated to produce an arc 17, so as to cause melting back of the rod end 18a until it no longer melts, but remains at sufficiently high temperature to prevent undesired electrode metal deposition thereon.

Figure 8:
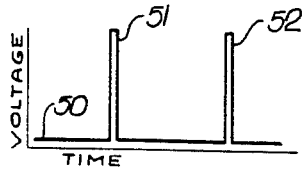
FIG. 8 is a voltage output diagram.

FIG. 8 shows a steady or D.C. voltage level 50 applied to the electrodes 13 and 14 in FIG. 1 to produce an arc from which light is steadily tranmitted via rod 18 to the utilization device 22. At times, the voltage may be sharply increased as at 51 to produce a short duration, higher intensity arc. This mode of operation is particularly useful, as for example in connection with alternate viewing and recording of light transmitted from an illuminated object 53 back through the endoscope tube 38 to external end 40. Viewing and recording apparatus 54 is shown in FIG. 5 as extending in position to receive such returned light, and as incorporating a path 55, 56 and 57 for lower intensity light transmitted to the user's eye 58, and a path 55, 59 and 60 for a high intensity flash of light (corresponds to level 51) transmitted to recording means 61 such as film.

Optical means 62 may effect switching of the light between path 56 and 57 and path 59 and 60. Source 15 in FIG. 1 may be controllable as indicated at 63 and 64 to vary the D.C. level 50 in FIG. 8 and the repetition rate of pulses 51, the latter also being capable of elimination by control 64. Control 63 may reduce the D.C. level so that only pulses 51 are sufficient to produce the arc.

Another example of a utilization device 22 with which the source 10 finds unusually advantageous combination is a microscope. For example, cable 21 may be extended to define a specimen support at the cable end, for direct and intense illumination of the specimen; or, the cable end may be directed closely at the specimen in a zone, as for example on a suitable auxiliary support. FIG. 2a shows the rod 18 extended at 18b for direct transmission of light to the utilization device 22a, thereby eliminating the light pipe bundle.

I claim:

1. In a light source, the combination comprising,
   a. an envelope
   b. means including an electrical power source and electrode structure connected therewith to produce light at a zone within the envelope, electrode metal becoming vaporized in said zone, said source producing electrical pulses and said electrode structure comprising spaced electrodes between which a pulsed arc is produced at said zone by said electrical pulses,
   c. light conducting rod means terminally facing within the envelope toward said zone, and
   d. said source including means to control application of voltage to the electrode structure and the repetition rate of said pulses, in relation to the closeness of the rod terminal to said zone, so that the rod terminal remains at temperatures below melting temperature but high enough to prevent vaporized metal deposition thereon during said pulsed arc production.

2. The combination of claim 1 wherein said power source also produces steady power supplied to at least one of said electrodes to produce steady light.

3. The combination of claim 1 wherein said rod means and envelope are integral and consist of glass.

4. The combination of claim 1 including light pipe structure having a light entrance terminal operatively connected with said rod means to receive light therefrom.

5. The combination of claim 1 including light pipe structure which includes a light pipe bundle having an entrance terminal outside the envelope and connected with the rod means to receive light therefrom.

6. The combination of claim 5 including an endoscope having an elongated narrow passage for returning light, and along which bundle transmitted light is conducted for illuminating an object from which said returning light is derived.

7. The combination of claim 6 wherein said bundle has an opposite terminal portion projecting along said endoscope viewing passage.

8. The combination of claim 1 wherein said rod means includes at least two separate rods within the envelope.

9. The combination of claim 8 wherein the rods have terminals facing said zone, and including a light reflector located to reflect light from said zone toward the rod terminals.

10. The combination of claim 1 wherein said source includes means to apply between 300 and 500 volts to the electrodes and to provide an arc duty cycle with an ON time of from 1 microsecond to 10 milliseconds and an OFF time of at least 1 millisecond.

11. The combination of claim 1 including microscope structure having a specimen zone, and a light conductor coupled to receive light from said rod means and extending to directly project said light onto said specimen zone.

* * * * *